United States Patent [19]
Boiko et al.

[11] Patent Number: 5,022,280
[45] Date of Patent: Jun. 11, 1991

[54] NOVIKOV GEARING

[76] Inventors: Leonid S. Boiko, ulitsa Deputatskaya, 6, kv. 26, Kiev; Viktor I. Korotkin, prospekt Stachki, 193/2, kv. 73, Rostov-na-Donu; Viktor Y. Veretennikov, ulitsa Repina, 19, kv. 12, Izhevsk; Efim G. Roslivker, prospekt Budennovsky, 72, kv. 51, Rostov-na-Donu; Roman V. Fedyakin, ulitsa Izumrudnaya, 13, korpus 1, kv. 242; Viktor A. Chesnokov, Petrovsko-Razumovskaya alleya, 26, kv. 30, both of Moscow; Anatoly S. Yakovlev, ulitsa Komsomolskaya, 198, kv. 8, Orel; Jury D. Kharitonov, ulitsa Sodruzhestva, 37, kv. 173, Rostov-na-Donu; Valery M. Fei, ulitsa Vyborgskaya, 31-37a, kv. 33; Emma N. Galichenko, ulitsa Gogolevskaya, 37/2, kv. 55, both of Kiev, all of U.S.S.R.

[21] Appl. No.: 445,732
[22] PCT Filed: Mar. 29, 1988
[86] PCT No.: PCT/SU88/00074
§ 371 Date: Nov. 28, 1989
§ 102(e) Date: Nov. 28, 1989
[87] PCT Pub. No.: WO89/09354
PCT Pub. Date: Oct. 5, 1989

[51] Int. Cl.$^5$ .............................................. F16H 55/08
[52] U.S. Cl. ................................. 74/462; 74/DIG. 12
[58] Field of Search ........................... 74/462, DIG. 12

[56] References Cited

U.S. PATENT DOCUMENTS 4,031,770  6/1977  Ishikawa ................ 74/DIG. 12 X

FOREIGN PATENT DOCUMENTS 240428   8/1969  U.S.S.R. .
735855   5/1980  U.S.S.R. .
875132  10/1981  U.S.S.R. ......................... 74/462
1075041A 2/1984  U.S.S.R. .

OTHER PUBLICATIONS

"Spur-gear Novikov Gearing with two Lines of Action" GOST 15023-76, 1976).

Primary Examiner—Allan D. Herrmann
Assistant Examiner—David W. Laub
Attorney, Agent, or Firm—Fleit, Jacobson, Cohn, Price, Holman & Stern

[57] ABSTRACT

A Novikov gearing comprising at least two gear elements the teeth of each element consisting of an addendum whose profile in the normal section is described by a convex curve, a dedendum and a fillet between the two. A portion of the fillet adjoining the addendum in the normal section has a convex profile with a radius of curvature smaller than a radius of curvature of the addendum.

1 Claim, 3 Drawing Sheets

NOVIKOV GEARING

TECHNICAL FIELD

The present invention relates to mechanical engineering and, more particularly, to Novikov gearing.

At present, the use of gearing faces a problem of stepping up the load capacity of the gear drive and reducing its specific materials consumption. This problem is solved by diverse design and technological methods one of which consists in improving the tooth geometry.

BACKGROUND OF THE INVENTION

Known in the prior art is a Novikov gearing comprising at least two gear elements the teeth of each element consisting of an addendum whose profile in the normal section is described by a convex curve, a dedendum and a fillet between them. ("Spur-gear Novikov Gearing with two Lines of Action" GOST 15023-76, 1976). The fillet has an involute surface which provides for a comparatively small clearance between the surfaces of meshing teeth in the zone of rolling surfaces of the gear elements.

The gearing of the present invention can be used to improve the contact strength of only the teeth with a comparatively low hardness of the meshing surfaces.

The use of this gearing with very hard teeth is rather inexpedient since a small clearance brings the fillet into action comparatively soon and, featuring a low contact strength, it is subjected to progressive crumbling in the zone of rolling surfaces of gear elements. In addition, an insufficient thickness of the dedendum limits its fracture strength.

Also known in the prior art is a Novikov gearing comprising at least two gear elements the teeth of each element consisting of an addendum whose profile in the normal section is described by a convex curve, a dedendum and a fillet connecting the two (SU, A 735855). The fillet has a concave profile in the normal section which ensures, in the case of gear elements with very hard teeth, the required clearance in the zone of the rolling surfaces of gear elements. The teeth on some parts of the dedendum and addendum profile are offset from the axis of symmetry in such a manner that the thickness of the dedendum is substantially greater than the thickness of the addendum which raises the fracture strength of the dedendum and of the tooth as a whole.

However, further increase of the tooth load capacity is limited by the insuffucient fracture strength of its addendum.

The main object of the present invention resides in providing a Novikov gearing with its teeth so designed that, while retaining the necessary clearance between the interacting surfaces of teeth in the fillet zone, said gearing should ensure a relatively higher fracture strength of the addendum and its load capacity as a whole.

SUMMARY OF THE INVENTION

The object of the invention is accomplished by providing a Novikov gearing comprising at least two gear elements, the teeth of each element containing an addendum whose profile in the normal section is described by a convex curve, a dedendum and their interconnecting fillet wherein, according to the invention, a part of the fillet adjoining the addendum has a convex profile in the normal section with the radius of curvature smaller than that of the addendum.

The part of the fillet realized according to the invention permits increasing the thickness of the critical section of the addendum and thereby increasing its fracture strength while retaining the required clearance between the interacting surfaces of teeth in the zone of rolling surfaces of the gear elements.

BRIEF DESCRIPTION OF THE DRAWINGS

Given below is a description of the present invention by way of example with references to the appended drawings in which.

BEST MODE FOR CARRYING OUT THE INVENTION

Figure 1:
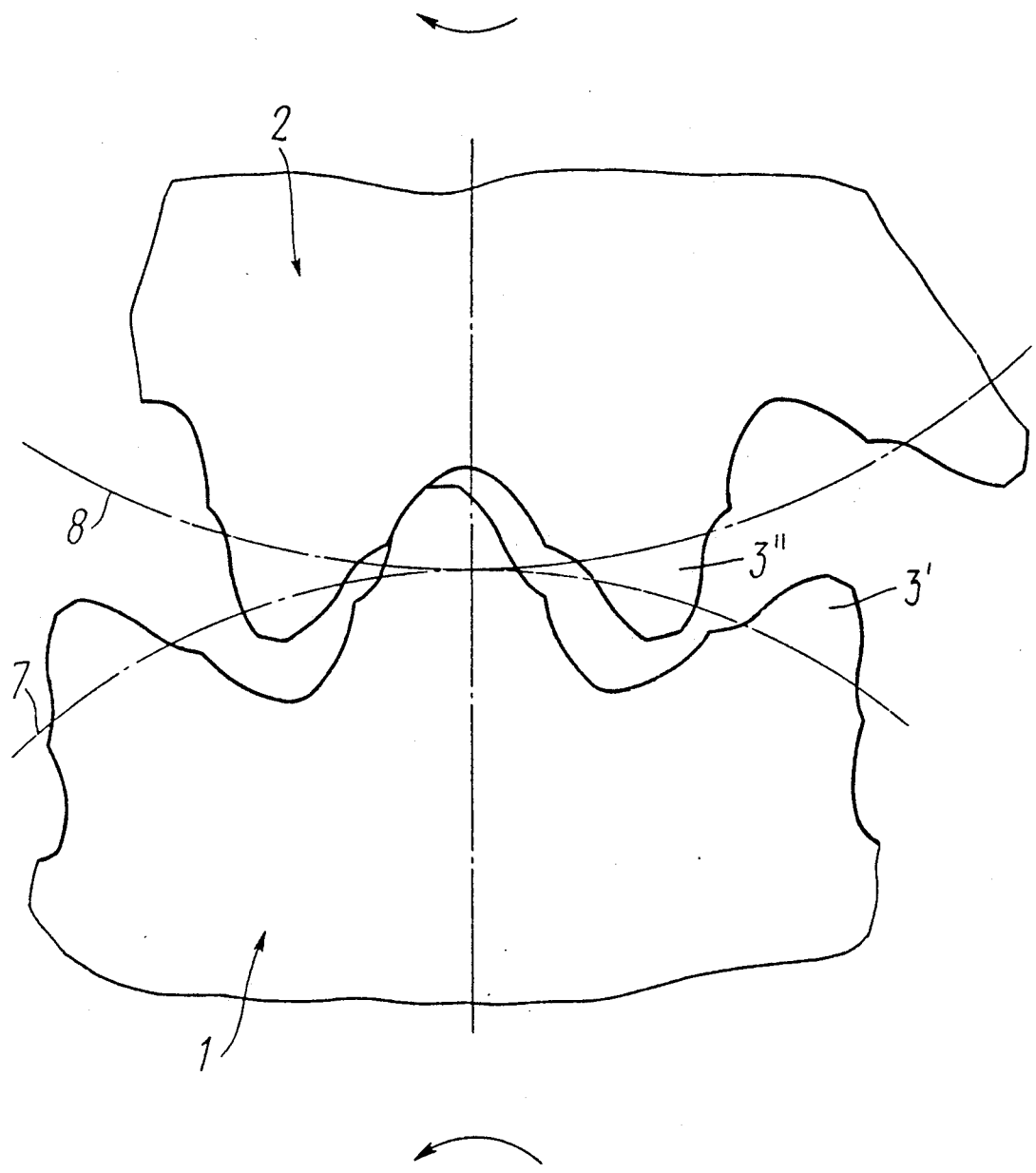
FIG. 1 illustrates a face section through the engaged gear elements.
Figure 2:
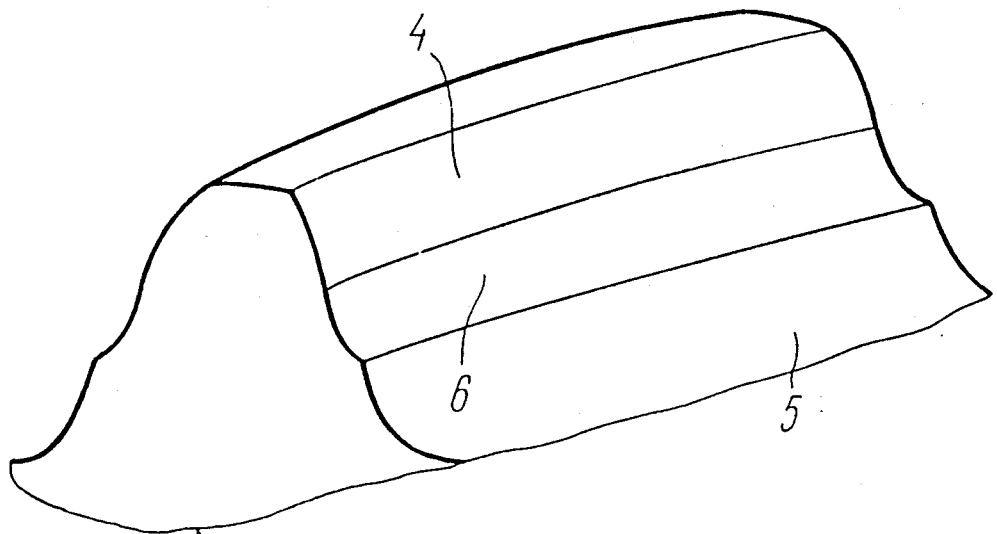
FIG. 2 is a tooth of the gear element.

The Novikov gearing comprises at least two gear elements 1 and 2 (FIG. 1). Teeth 3',3" of each of these elements 1 and 2 comprise and addendum 4 (FIG. 2), a dedendum 5 and a fillet 6.

The addendum 4 in a normal section of the tooth has a profile described by a convex curve ab (FIG. 3) which, in a general case, has a variable radius of curvature $\rho_1$.

Figure 3:
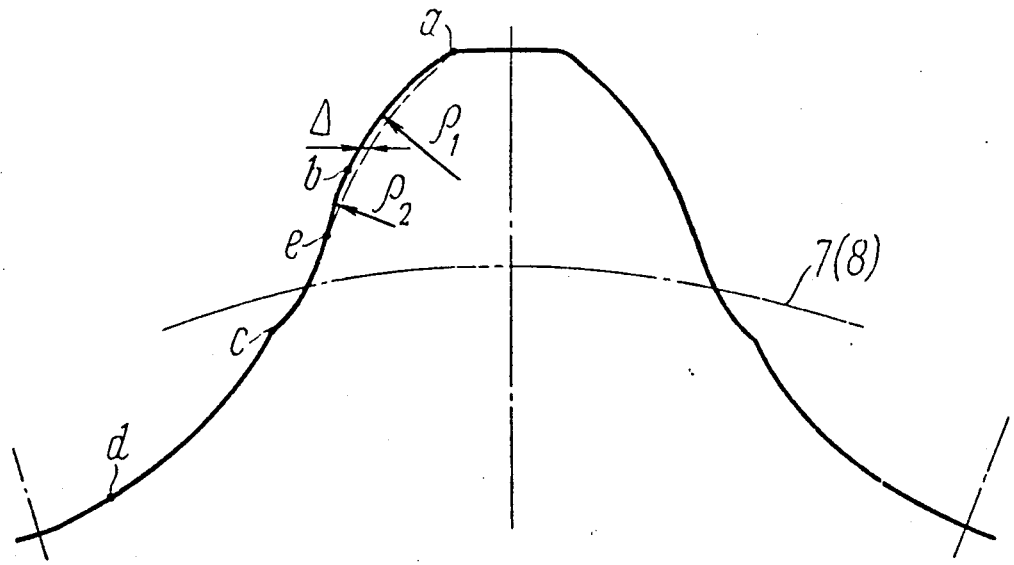
FIG. 3 is the tooth profile in normal section.

The profile of the dedendum 5 (FIG. 2) is described by a concave curve cd (FIG. 3).

Figure 4:
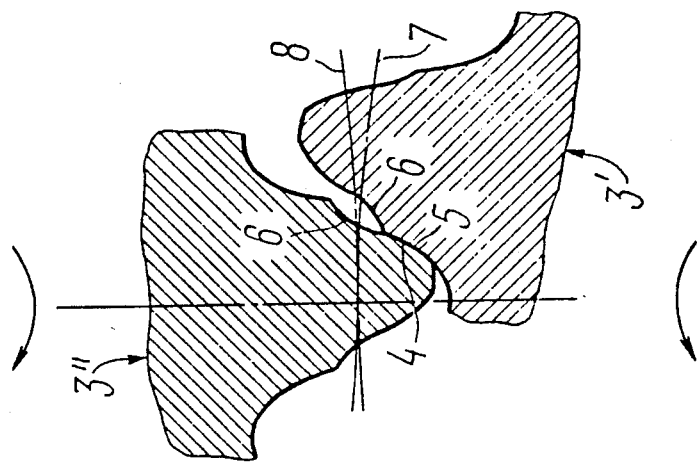
FIGS. 4 through 6 are fragments of the Novikov gearing according to the invention in various phases of meshing.
Figure 5:
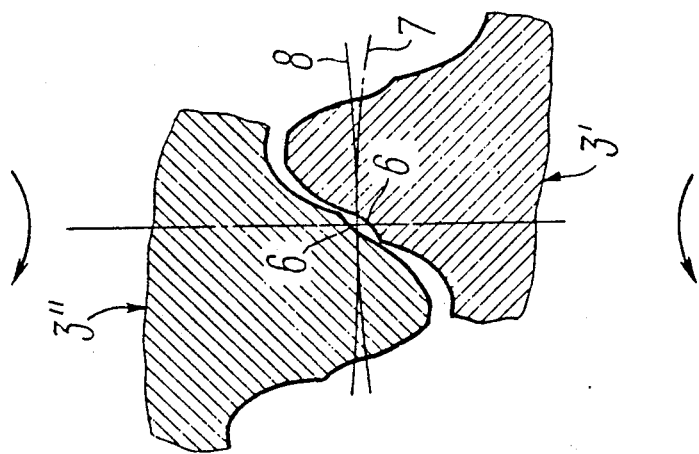
Figure 6:
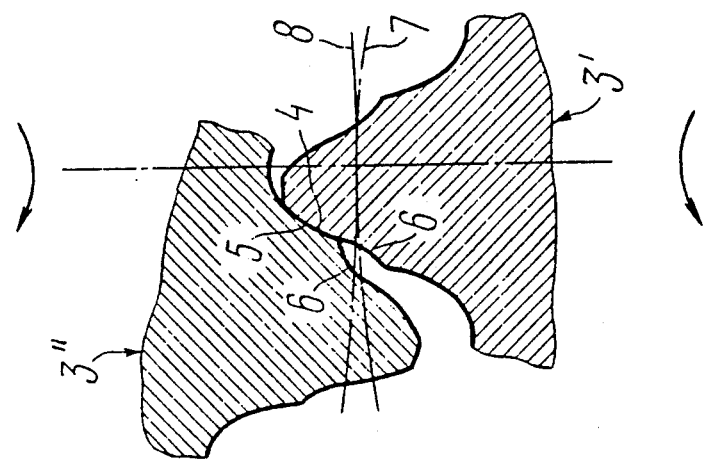

The fillet 6 (FIG. 2) has a profile bc (FIG. 3). A part of the fillet 6 (FIG. 2) adjoining the addendum 4 has a profile described by a convex curve be (FIG. 3). The convex curve be has in a general case a variable radius of curvature $\rho_2$ which is always smaller than the radius $\rho_1$. Inasmuch as $\rho_1 < \rho_2$, the thickness of the addendum 4 (FIG. 2) grows by a value of 2 $\Delta$ (FIG. 3) in comparison with the prior art, which is shown by a dotted line in the drawing. This increases a fracture strength of the addendum 4 (FIG. 2) and of the tooth as a whole, while retaining in a zone of rolling surfaces 7, 8 (FIG. 1) of the gear elements 1, 2, the required clearance between the surfaces of the fillets 6 of the meshing teeth in all the engagement phases shown in FIGS. 4 through 6 which permits the claimed Novikov gearing to use high-hardness teeth.

A torque is transmitted from the gear element 1 (FIG. 1) to the gear element 2 as follows.

The driving gear element 1 rotates counter-clockwise. In any one of the considered face sections the dedendum 5 (FIG. 4) of the tooth of the driving gear element 1 (FIG. 1) first interacts with the dedendum 4 (FIG. 4) of the tooth of the driven gear element 2 (FIG. 1).

Then the mating teeth (FIG. 5) pass through an intermediate position wherein the clearance between the fillets 6 in the zone of the rolling surfaces 7, 8 is at a minimum.

Later on, the addendum 4 (FIG. 6) of the tooth 3' interact with the dedendum 5 of the tooth 3" of the mating gear element 2 (FIG. 1). In this manner the driven gear element 2 is set in rotation in a clockwise direction. Owing to the fact, that the addendums 4 (FIGS. 4-6) have a thickness increased by the value of 2 $\Delta$ (FIG. 3), the stresses arising in them are smaller than in the addendums used in the prior art, thus permitting the transmission of a higher torque.

The Novikov gearing realized according to the invention, while retaining the overall size and weight of the gearing, permits raising the transmitted load or, at a given load, reducing the material consumption of the gearing in comparison with the prior art.

INDUSTRIAL APPLICABILITY

The hereinproposed gearing will be utilized with the highest efficiency in the reduction gears of general mechanical engineering as well as in transport and heavy mechanical engineering.

We claim:

1. A Novikov gearing comprising at least two gear elements with the teeth of each element consisting of an addendum whose profile in a normal section is described by a convex curve, a dedendum and a fillet interconnecting the two, characterized in that a part (be) of the fillet (6) adjoining the addendum (4) has a convex profile in the normal section, a radius of curvature ($\rho_2$) of this section being smaller than the radius of a curvature ($\rho_1$) of the addendum (4).

* * * * *